United States Patent
Lahtinen

(10) Patent No.: US 6,243,582 B1
(45) Date of Patent: Jun. 5, 2001

(54) INTER-MSC HANDOVER IN HIGH-SPEED DATA TRANSMISSION

(75) Inventor: Lauri Lahtinen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/091,336

(22) PCT Filed: Dec. 17, 1996

(86) PCT No.: PCT/FI96/00668

§ 371 Date: Jun. 17, 1998

§ 102(e) Date: Jun. 17, 1998

(87) PCT Pub. No.: WO97/23110

PCT Pub. Date: Jun. 26, 1997

(30) Foreign Application Priority Data

Dec. 18, 1995 (FI) ........................................ 956089

(51) Int. Cl.⁷ ........................................ H04Q 7/20
(52) U.S. Cl. ........................................ 455/436; 455/439
(58) Field of Search ........................................ 455/436, 437, 455/438–444; 370/331–333, 337, 347, 468

(56) References Cited

U.S. PATENT DOCUMENTS

| | | | |
|---|---|---|---|
| 5,291,544 | * 3/1994 | Hecker | 455/436 |
| 5,446,739 | * 8/1995 | Nakano et al. | 455/555 |
| 5,761,619 | * 6/1998 | Danne et al. | 455/422 |
| 5,850,607 | * 12/1998 | Muszynski | 455/442 |
| 5,898,925 | * 4/1999 | Honkassalo et al. | 455/437 |
| 5,923,650 | * 7/1999 | Chen et al. | 370/331 |
| 5,982,782 | * 11/1999 | Sasasmato | 370/465 |

FOREIGN PATENT DOCUMENTS

| | | | |
|---|---|---|---|
| 2112762 | 7/1994 | (CA) . | |
| 671 824 | 9/1995 | (EP) . | |
| 95/31868 | 11/1995 | (WO) . | |
| WO 95/31879 | * 11/1995 | (WO) | H04Q/7/22 |
| 96/10305 | 4/1996 | (WO) . | |

OTHER PUBLICATIONS

Section 9.1.15 GSM Recommendation, 04.08, version 4.11.0, published in Oct. 1995.

* cited by examiner

Primary Examiner—Vivian Chang
Assistant Examiner—Duc Nguyen
(74) Attorney, Agent, or Firm—Pillsbury Winthrop LLP

(57) ABSTRACT

Implementing a method for a handover between mobile switching centers (MSC-A, MSC-B) of a cellular mobile network in high-speed data transmission wherein several channels are allocated to a mobile station (MS). In the method, the first mobile switching center (MSC-A) indicates to the second mobile switching center (MSC-B) at least the minimum number of channels required over the connection. The second mobile switching center (MSC-B) attempts to allocate at least the indicated minimum number of channels. The second mobile switching enter (MSC-B) transmits to the first mobile switching center (MSC-A) data about the channels it has allocated and at least one handover number (HON). The first mobile switching (MSC-A) may use the same handover number (HON) to perform a handover to each subchannel. According to a preferred embodiment of the invention, as many handover numbers (HON) are allocated directly as there are channels allocated to the connection.

8 Claims, 2 Drawing Sheets

INTER-MSC HANDOVER IN HIGH-SPEED DATA TRANSMISSION

This application is the national phase of international application PCT/FI96/00668 filed Dec. 17, 1996 which designated the U.S.

BACKGROUND OF THE INVENTION

The invention relates to the use of high-speed data transmission in a mobile network and especially to a handover between mobile switching centers.

FIG. 1 shows the elements that are essential for the invention in a cellular mobile system. Mobile stations MS communicate with base transceiver stations BTS servicing radio cells Cn. The base transceiver stations are connected via base station controllers BSC to mobile switching centers MSC. A subsystem controlled by one BSC (comprising the BTSs controlled by the BSC and other elements of the mobile network not shown in the figure) is called a base station subsystem BSS. The interface between an MSC and a BSS is called an A-interface.

The MSC handles the coupling of incoming and outgoing calls. It performs similar tasks as an exchange of a public switched telephone network PSTN. In addition to these tasks, it also carries out functions that are only characteristic of mobile telephone communication, such as location management of subscribers, together with the subscriber registers in the network. The subscriber registers of the GSM system include at least a home location register HLR and a visitor location register VLR that are not shown in FIG. 1.

The GSM system is a time division multiple access (TDMA) system where the communication on the radio path takes place on a time division basis in successive TDMA frames each of which consists of several time slots. In each time slot, a short information packet is transmitted in the from of a radio-frequency burst that consists of a number of modulated bits. In addition to traffic channels transmitting speech and data, the GSM system also utilizes control channels for performing signaling between a base transceiver station and mobile stations.

Telephone traffic between MSCs is transmitted for example via a PSTN. Also, signaling data is transmitted between MSCs via a so-called MAP (Mobile Application Part) connection. The MAP procedure is defined in GSM standard 09.02 of the ETSI.

When an MS moves from one cell to another, a handover is performed in the system. There are several types of handovers depending of which elements of the mobile system participate in the handover. When the handover takes place within the area of the same base station controller BSC-x, it is called an inter-BTS handover. When the handover takes place within the area of the same mobile switching center MSC-x, it is called an intra-MSC handover. When the MS moves from the area of the first mobile switching center MSC-A to the area of a second mobile switching center MSC-B, the handover is called an inter-MSC handover.

According to the known technology, an inter-MSC handover takes place in the following manner. When an MS that has started a call in the area of MSC-A moves to a cell within the area of another mobile switching center MSC-B, the first mobile switching center MSC-A derives the address of MSC-B from the data of the target cell and establishes an MAP connection to MSC-B. Over the MAP connection MSC-A transmits to MSC-B data about the cell to which it should allocate resources (such as a radio channel and corresponding connections to the fixed network). After the resource allocation, a handover number HON is allocated. Data about the channel and the HON is transmitted to MSC-A via the MAP connection. After MSC-A has obtained the HON, it establishes a connection via the PSTN by means of the HON. When the PSTN connection has been set up, MSC-B transmits an acknowledgment to MSC-A. MSC-A then transmits to MSC-B a handover command (HANDOVER_COMMAND) which is forwarded to the MS. After a successful handover the MS transmits a HANDOVER_COMPLETE message in the uplink direction. This data is forwarded to MSC-A, which releases the earlier resources. The handover command is described in GSM recommendation 04.08, version 4.5.0, June 1993, section 9.1.15.

FIG. 2 shows steps and signaling messages related to a handover between a first mobile switching center MSC-A and a second mobile switching center MSC-B. It should be noted, however, that during a handover also other messages, which are not shown in the figure for the sake of clarity, are transmitted in addition to the messages described herein. 1: An MS transmits the results of the neighbouring cell measurements (MEAS_REPORT) to the servicing base station system BSS-A. 2: BSC-A determines the need for a handover to a cell of the new base station system BSS-B, for example on the basis of radio path criteria. 3: BSS-A transmits a request for a handover HANDOVER_REQUIRED to the servicing mobile switching center MSC-A. 4: MSC-A transmits a handover request PREP_HANDOVER_REQ to the new mobile switching center MSC-B. 5: MSC-B transmits a request for a handover HANDOVER_REQUEST to BSS-B, more precisely to the BSC of the system, the request asking the new base station system BSS-B to provide the required service. 6: If there are resources available, BSS-B transmits a message HANDOVER_REQUEST_ACKNOWLEDGE to MSC-B. 7: MSC-B transmits to the servicing center MSC-A an acknowledgment message PREP_HANDOVER_RESP. 8: MSC_A transmits to the servicing base station system BSS-A a HANDOVER_COMMAND message. 9: BSS-A transmits to the MS a HANDOVER_COMMAND message. 10: The MS can now start communicating in the new cell in the base station system BSS-B. 11: The MS transmits to BSS-B an acknowledgment HANDOVER_COMPLETE: 12: BSS-B transmits a corresponding acknowledgment HANDOVER_COMPLETE to MSC-B. 13: MSC-B transmits to MSC-A an acknowledgment message SEND_END_SIGNAL_REQ informing MSC-A that the MS has moved to the new base station system in MSC-B. 14–15: The resources allocated to the call are finally released in the old base station system BSS-A.

A standard GSM connection and a handover employed therein only relate to a normal speech or data connection that maintains a connection via only one subchannel, such as a time slot. In high-speed data transmission, an MS that requires data transmission of higher rate than what one traffic channel can provide for transmitting user data is allocated a channel or time slot configuration comprising two or more time slots from the same or different frame on the same or different frequency by means of so-called multi-slot access. It is not essential for the present invention which multi-slot access is used. An example of multi-slot access where the present invention is applicable is disclosed in Finnish patent applications 942190 and 942191 by the same applicant. In these applications, a high-speed signal is multiplexed to several channels (time slots) having a lower speed, it is thus transmitted over the radio path and demultiplexed in the receiver back into one signal. If this technique is applied to the above-described handover according to known technology, the following changes occur:

In step 6, the acknowledgment message HANDOVER_REQUEST_ACKNOWLEDGE contains data about the allocated data rate and a description of the allocated time slots. In step 7, the acknowledgment message PREP_HANDOVER_RESP contains data about the allocated data rate and a description of the allocated time slots, in addition to the content specified in the GSM standards. In steps 8 and 9, the HANDOVER_COMMAND contains data about the allocated data rate and a description of the allocated time slots. In step 10, the mobile station uses the allocated channel configuration and data rate and the allocated time slots.

However, the aforementioned patent applications do not discuss in detail how a data connection utilizing several time slots would allocate handover numbers to different subchannels during a handover.

Problems may also occur during a handover in high-speed data transmission if the new cell cannot provide a sufficient number of channels. Problems occur if a mobile station operates with a high data rate and the new cell is not able to provide after the handover a data rate equal to that supplied by the previous cell.

BRIEF SUMMARY OF THE INVENTION

An object of the invention is therefore to provide a method and an arrangement for implementing an inter-MSC handover. Another object of the invention is to provide a method and an arrangement for a handover in such a way that resources available in different cells can be allocated to subscribers in a flexible manner. The objects of the invention are achieved with a method and an arrangement characterized by what is disclosed in the independent claims. The preferred embodiments are set forth in dependent claims.

BRIEF DESCRIPTION OF THE SEVERAL VIEWS OF THE DRAWING

The invention will be described in greater detail in connection with the preferred embodiments and with reference to the accompanying drawings, in which.

DETAILED DESCRIPTION OF THE INVENTION

Figure 1:
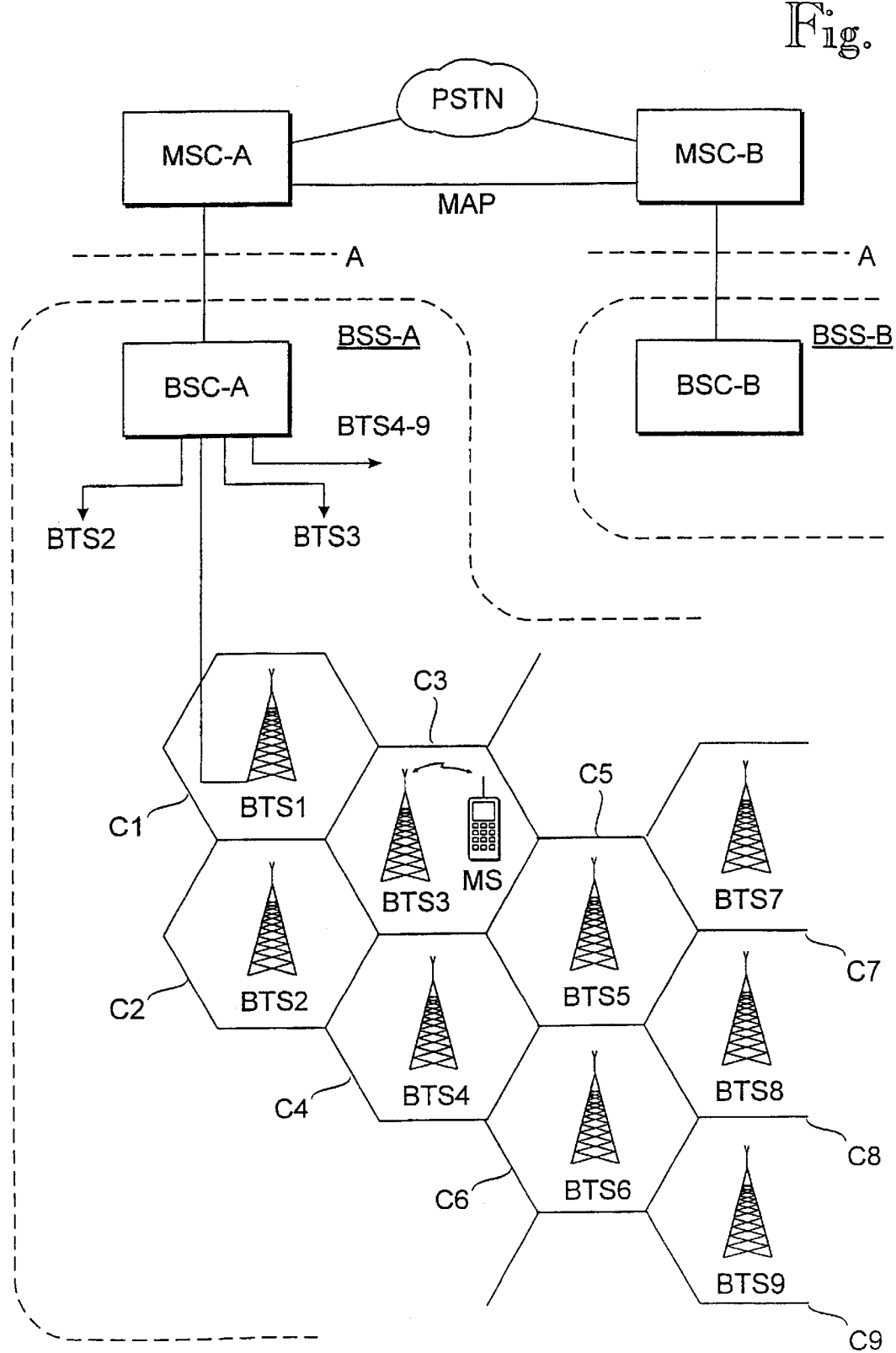
FIG. 1 shows the elements that are essential to the invention in a cellular mobile system.
Figure 2:
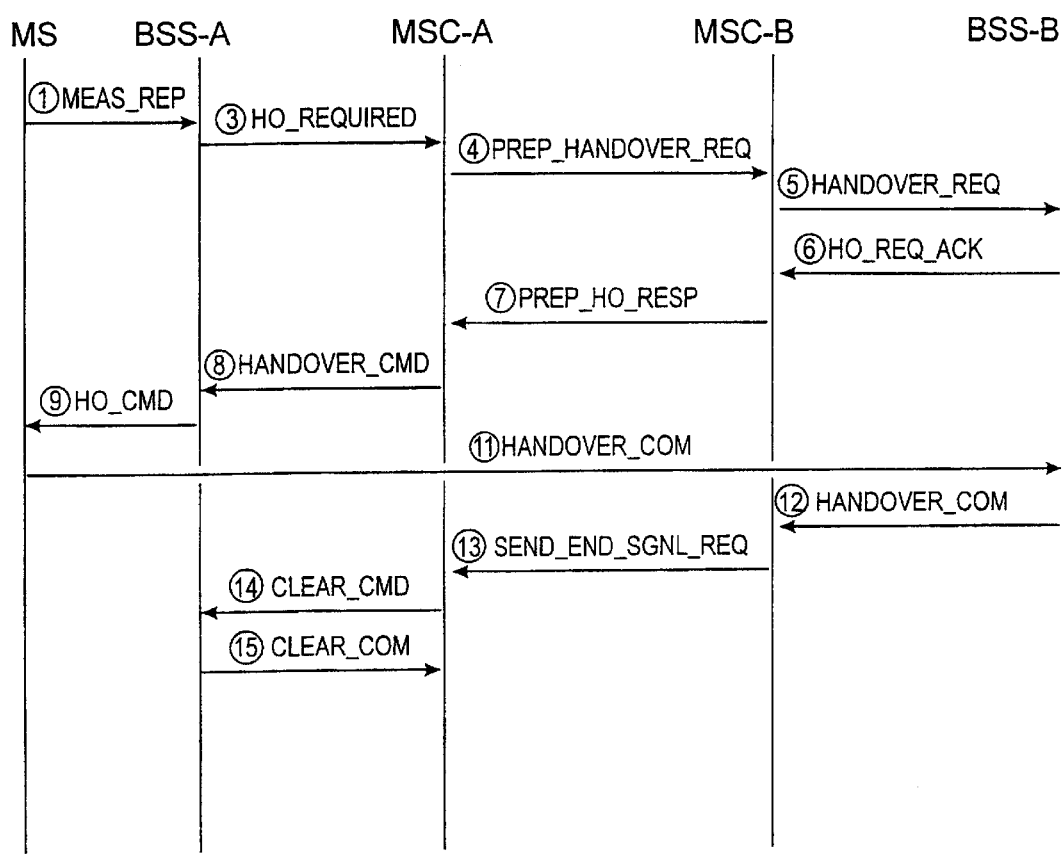
FIG. 2 shows different steps of an inter-MSC handover.

With reference to FIGS. 1 and 2, parallel call set-up can be implemented at least in two alternative manners. According to the first embodiment of the invention, the procedure is as follows. MSC-A indicates to MSC-B the required channel type as a parameter of the message PREPARE_HANDOVER (step 4 in FIG. 2). On the basis of this data, MSC-B can select different amounts of resources depending on the traffic situation. During the resource allocation, MSC-B indicates to MSC-A the number of circuits (CIRCUIT_COUNT) required between the MSCs for channels allocated over the air interface. The number of circuits can be indicated preferably as a parameter of the message PREPARE_HANDOVER_RESPONSE (step 7). In this embodiment, MSC-B allocates only one HON. MSC-A utilizes this allocated HON as many times as indicated by the number of circuits (CIRCUIT_COUNT). In a handover of one connection according to known technology, the previous resources and the HON would be released at this stage. According to the invention, PSTN connections can be set up one after another in such a way that the establishment of the next connection is only started after an address complete indication has been obtained for the set-up of the preceding connection. Both centers maintain the mutual order of the connections (subchannels) so that data divided into several subchannels can be recombined correctly. The order can be maintained for example by transmitting, in connection with the set-up of the PSTN connection, a separate index by means of which the mutual order of the subchannels can be maintained.

The advantage of this embodiment is that few changes are required for the MAP signaling. The only change is informing the number of the circuits (CIRCUIT_COUNT). The drawback is that this embodiment requires changes in the PSTN signaling, which is in practice more difficult to implement than the corresponding changes in the MAP signaling.

According to the preferred embodiment of the invention, all changes can be restricted to the MAP signaling. This is achieved by deviating from the above-described embodiment in such a way that MSC-B immediately allocates HONs in a number equalling the number of the radio channels allocated to the MS over the air interface. In this embodiment, the HON can be used directly as an index to ensure that the mutual order of the subchannels is maintained.

It is possible that during a handover the MS cannot be allocated as many time slots in the new cell as were available in the old cell. Alternatively, it is possible that a call has been started with a minimum number of time slots, but during the handover the maximum number requested by the MS can be allocated in the new cell. When such a variable speed system is used, a handover can be complemented with a technique described in another Finnish patent application 944487, filed on Sep. 27, 1994, (which corresponds to U.S. patent application Ser. No. 08/817,963, filed on Mar. 27, 1997).

According to FI 944487, at the beginning of call set-up the MS informs the servicing mobile network of the minimum and maximum requirements for the transmission rate of the user data, i.e. two new parameters, in addition to the previous parameters. Requirements concerning the service can also be indicated in some other manner. The MS may for example indicate the suitable quality class of the service, so that it is provided with data channel capacity according to at least the minimum requirement of this quality class and at most the maximum requirement of the class.

In the following examples, these minimum and maximum requirements are defined with the parameters "required service level" and "desired service level", but the requirements can also be defined in some other manner. The desired level of service determines the data rate that the MS wishes to use, i.e. the channel configuration formed by one or several channels or time slots. This desired data rate is also the maximum data rate allowed for the MS. The required service level determines the minimum data rate that must be provided to ensure continuous data transmission. By means of these parameters the servicing mobile network can, depending on the network resources, allocate to a data call a data rate between the desired maximum data rate and the required minimum data rate. If even the minimum data rate cannot be provided, the data call is terminated. It is also possible that the MS does not set specific minimum service requirements concerning the data rate in some situation or it lets the mobile network freely select the minimum capacity.

Taking this technology into account changes the above-described handover as follows. The numbering still follows the numbering of steps used in connection with FIG. 2. In step 3, in addition to the normal GSM message the handover request may also comprise the desired maximum data rate DRMAX and the required minimum data rate DRMIN that the MS has provided at the beginning of the data call. The BSC or the BTS stores the parameters DRMAX and DRMIN for each MS that is engaged in a high-speed data call within its area. In step 4, MSC-A transmits to the new mobile switching center MSC-B a handover request PREP HANDOVER REQ that may comprise the desired parameters DRMAX and DRMIN in addition to the normal GSM message. Also in step 5 the message comprises the parameters DRMAX and DRMIN in addition to the normal GSM message. BSS-S selects a time slot configuration that provides a data rate that is at least DRMIN and at most DRMAX, depending at least on the time slot resources of the target cell of the handover. The data rate (time slot configuration) provided by the new cell is not necessarily the same as in the old cell. In other words, the data rate may increase or decrease in the new cell depending on the available resources and within the limits set by the parameters DRMAX and DRMIN. If the required minimum data rate DRMIN cannot be provided, the handover is interrupted.

It is evident for a person skilled in the art that as the technology develops the basic idea of the invention can be implemented in several different manners. Therefore, the invention and the embodiments thereof are not restricted to the above-described examples but they may vary within the scope of the claims.

What is claimed is:

1. A method for performing a handover between a first mobile switching center and a second mobile switching center of a mobile network in a high-speed data transmission wherein a mobile station has been allocated several channels, the method comprising:

indicating from the first mobile switching center to the second mobile switching center at least a minimum number of channels required for a connection between the first and the second mobile switching centers;

attempting to allocate at least the indicated minimum number of channels required for the connection by the second mobile switching center;

transmitting from the second mobile switching center to the first mobile switching center data about channels the second mobile switching center has allocated including a number of channels and a handover number;

using the handover number by the first mobile switching center to perform the handover; and using the same handover number by the first mobile switching center a number of times as indicated by the number of the channels, wherein the second mobile switching center transmits to the first mobile switching center the number of the channels the second mobile switching center has allocated.

2. A method for performing a handover between a first mobile switching center and a second mobile switching center of a mobile network in a high-speed data transmission wherein a mobile station has been allocated several channels, the method comprising:

indicating from the first mobile switching center to the second mobile switching center at least a minimum number of channels required for a connection between the first and the second mobile switching centers;

attempting to allocate at least the indicated minimum number of channels required for the connection by the second mobile switching center;

transmitting from the second mobile switching center to the first mobile switching center data about channels the second mobile switching center has allocated including a number of channels and a handover number;

using the handover number by the first mobile switching center to perform the handover;

transmitting from the second mobile switching center to the first mobile switching center the handover number and the number of channels the second mobile switching center has allocated;

using the same handover number by the first mobile switching center a number of times as indicated by the number of the channels; and transmitting from the second mobile switching center to the first mobile switching center an index by means of which a mutual order of subchannels can be maintained.

3. A method for performing a handover between a first mobile switching center and a second mobile switching center of a mobile network in a high-speed data transmission wherein a mobile station has been allocated several channels, the method comprising:

indicating from the first mobile switching center to the second mobile switching center at least a minimum number of channels required for a connection between the first and the second mobile switching centers;

attempting to allocate at least the indicated minimum number of channels required for the connection by the second mobile switching center;

transmitting from the second mobile switching center to the first mobile switching center data about channels the second mobile switching center has allocated including a number of channels and a handover number;

using the handover number by the first mobile switching center to perform the handover; and transmitting from the second mobile switching center to the first mobile switching center as many handover numbers as the second mobile switching center has allocated the number of channels.

4. A method for performing a handover between a first mobile switching center and a second mobile switching center of a mobile network in a high-speed data transmission wherein a mobile station has been allocated several channels, the method comprising:

indicating from the first mobile switching center to the second mobile switching center at least a minimum number of channels required for a connection between the first and the second mobile switching centers;

attempting to allocate a maximum number of channels required for the connection by the second mobile switching center;

transmitting from the second mobile switching center to the first mobile switching center data about channels the second mobile switching center has allocated and at least one handover number;

using the at least one handover number by the first mobile switching center to perform the handover; and indicating from the first mobile switching center to the second mobile switching center, in addition to the indicated minimum number of channels required for the connection, the maximum number of channels required for the connection, wherein the second mobile switching center is arranged to attempt to allocate the indicated maximum number of channels.

5. An arrangement to perform a handover between a first mobile switching center and a second mobile switching center of a mobile network in a high-speed data transmission wherein a mobile station has been allocated several channels, the arrangement comprising:

a channel indicating mechanism of the first mobile switching center arranged to indicate to the second mobile switching center at least a minimum number of channels required for a connection between the first and the second mobile switching centers;

a channel allocating mechanism of the second mobile switching center arranged to attempt to allocate at least the indicated minimum number of channels required for the connection;

a data transmitting mechanism of the second mobile switching center arranged to transmit data about channels the second mobile switching center has allocated including a number of channels and at least one handover number;

a handover number using mechanism of the first mobile switching center arranged to use the handover number to perform the handover; and a handover number transmitting mechanism of the second mobile switching center arranged to transmit to the first mobile switching center a handover number and the number of channels the second mobile switching center has allocated, wherein the handover number using mechanism of the first mobile switching center further arranged to use the same handover number a number of times as indicated by the number of channels.

6. An arrangement according to claim 5, further comprising an index transmitting mechanism of the second mobile switching center arranged to transmit to the first mobile switching center an index by means of which a mutual order of subchannels can be maintained.

7. An arrangement to perform a handover between a first mobile switching center and a second mobile switching center of a mobile network in a high-speed data transmission wherein a mobile station has been allocated several channels, the arrangement comprising:

a channel indicating mechanism of the first mobile switching center arranged to indicate to the second mobile switching center at least a minimum number of channels required for a connection between the first and the second mobile switching centers;

a channel allocating mechanism of the second mobile switching center arranged to attempt to allocate at least the indicated minimum number of channels required for the connection;

a data transmitting mechanism of the second mobile switching center arranged to transmit data about channels the second mobile switching center has allocated including a number of channels and a handover number; and a handover number using mechanism of the first mobile switching center arranged to use the handover number to perform the handover, wherein the second mobile switching center is arranged to transmit to the first mobile switching center as many handover numbers as the number of channels the second mobile switching center has allocated.

8. An arrangement to perform a handover between a first mobile switching center and a second mobile switching center of a mobile network in a high-speed data transmission wherein a mobile station has been allocated several channels, the arrangement comprising:

a channel indicating mechanism of the first mobile switching center arranged to indicate to the second mobile switching center at least a minimum number of channels required for a connection between the first and the second mobile switching centers;

a channel allocating mechanism of the second mobile switching center arranged to attempt to allocate at least the indicated minimum number of channels required for the connection;

a data transmitting mechanism of the second mobile switching center arranged to transmit data about channels the second mobile switching center has allocated and at least one handover number; and a handover number using mechanism of the first mobile switching center arranged to use the at least one handover number to perform the handover, wherein the channel indicating mechanism of the first mobile switching center, in addition to the indicated minimum number of channels required for the connection, the channel indicating mechanism of the first mobile switching center is also arranged to indicate to the second mobile switching center the maximum number of channels required over the connection.

* * * * *